United States Patent
Cai (10) Patent No.: US 9,038,653 B2
(45) Date of Patent: May 26, 2015

(54) DOUBLE-HANDLE FAUCET (71) Applicant: Jilin Cai, Fujian Province (CN)

(72) Inventor: Jilin Cai, Fujian Province (CN)

(*) Notice: Subject to any disclaimer, the term of this patent is extended or adjusted under 35 U.S.C. 154(b) by 107 days.

(21) Appl. No.: 13/899,573

(22) Filed: May 22, 2013

(65) Prior Publication Data

US 2014/0345724 A1 Nov. 27, 2014

(51) Int. Cl.
*E03C 1/04* (2006.01)
*E03C 1/02* (2006.01)
*F16K 11/22* (2006.01)
*F16K 11/00* (2006.01)
*F16K 31/60* (2006.01)
*F16K 11/20* (2006.01)

(52) U.S. Cl.
CPC .............. *F16K 19/006* (2013.01); *F16K 31/60* (2013.01); *F16K 11/207* (2013.01); *E03C 2001/0416* (2013.01); *E03C 1/0401* (2013.01)

(58) Field of Classification Search
CPC ....... E03C 1/0404; E03C 1/0401; E03C 1/04; E03C 2001/0416; F16K 19/006; F16K 11/207; F16K 31/60
USPC .............. 137/315.12, 315.13, 603, 801, 359, 137/375; 4/678
See application file for complete search history.

(56) References Cited

U.S. PATENT DOCUMENTS

| | | | |
|---|---|---|---|
| 2008/0264502 A1* | 10/2008 | Lin ............................ | 137/603 |
| 2010/0096034 A1* | 4/2010 | Hou ........................... | 137/801 |
| 2012/0056351 A1* | 3/2012 | Xu ............................. | 264/277 |
| 2013/0192686 A1* | 8/2013 | Zhu et al. .................. | 137/15.01 |
| 2013/0213509 A1* | 8/2013 | Thomas ..................... | 137/801 |

* cited by examiner

*Primary Examiner* — Atif Chaudry (57) ABSTRACT

The present invention discloses a double-handle faucet, comprising two valve seats, two spools, two inlet pins, two handles, an outlet pipe, a connecting tube, an upper panel, and a lower panel. The double-handle faucet further comprises two semi-cladding members. The two valve seats, the connecting tube, and the two semi-cladding members are all made of a plastic material. Each of the valve seats is provided with an upper annular flange and a lower annular flange. Each of the inlet pins is further provided with a connecting ring. Each of the semi-cladding members comprises two first enveloping parts and a second enveloping part. The two first enveloping parts are located at both sides and correspond to the positions of the valve seats. The second enveloping parts of the two valve seats together cover the outer side of the connecting tube. The two semi-cladding members oppositely cover the outer side of two valve seats to fasten the inlet pin and the valve seats. As compared with the prior art, the present invention not only avoids lead contamination, but also has a low cost.

2 Claims, 7 Drawing Sheets

DOUBLE-HANDLE FAUCET

BACKGROUND OF THE INVENTION

The present invention relates to the field of bathroom accessories, and more particularly to a double-handle faucet, which can avoid lead hazard, ensures a structural strength, and has a low cost.

Figure 1:
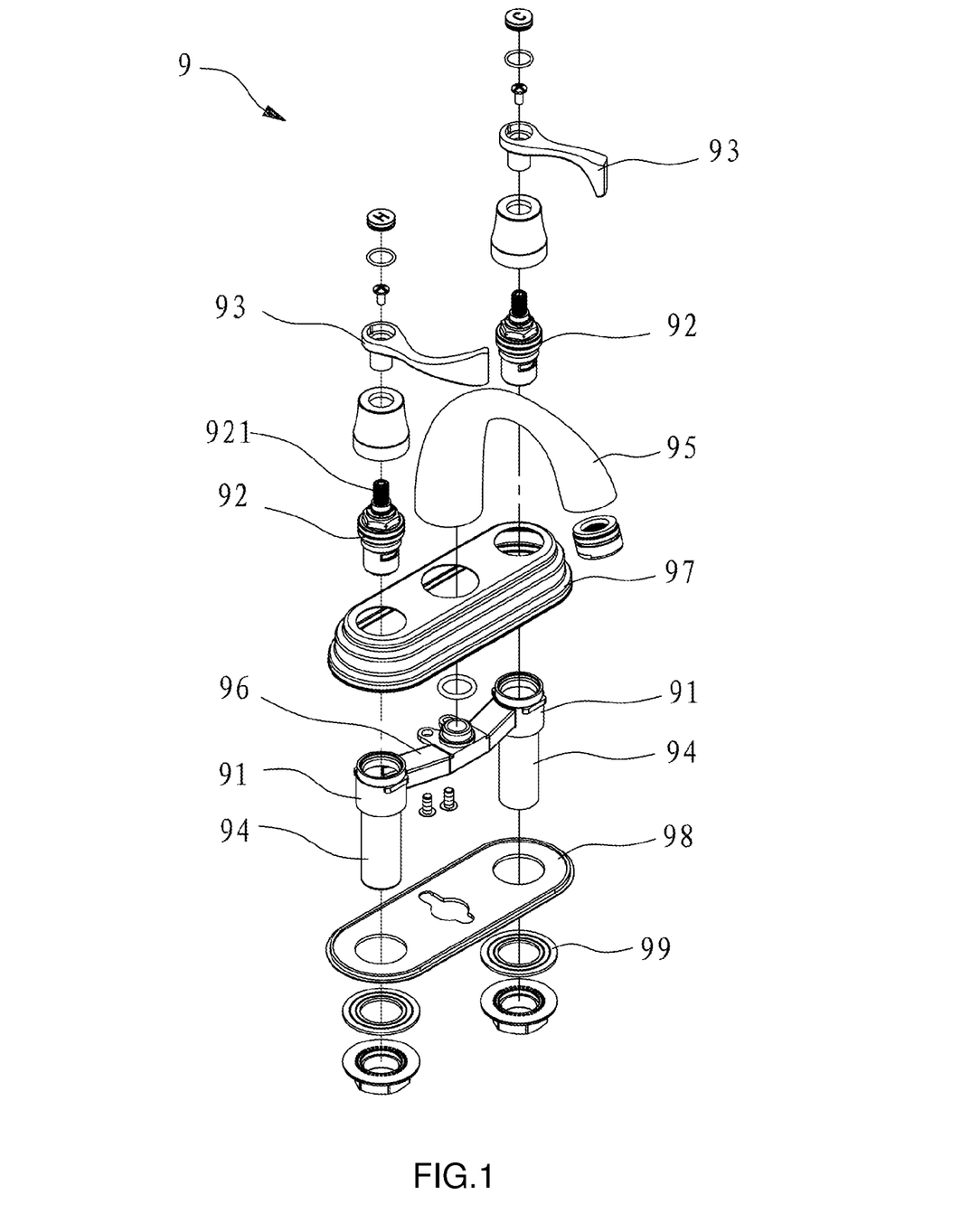
FIG. 1 is an exploded view showing the existing double-handle faucet.
Figure 2:
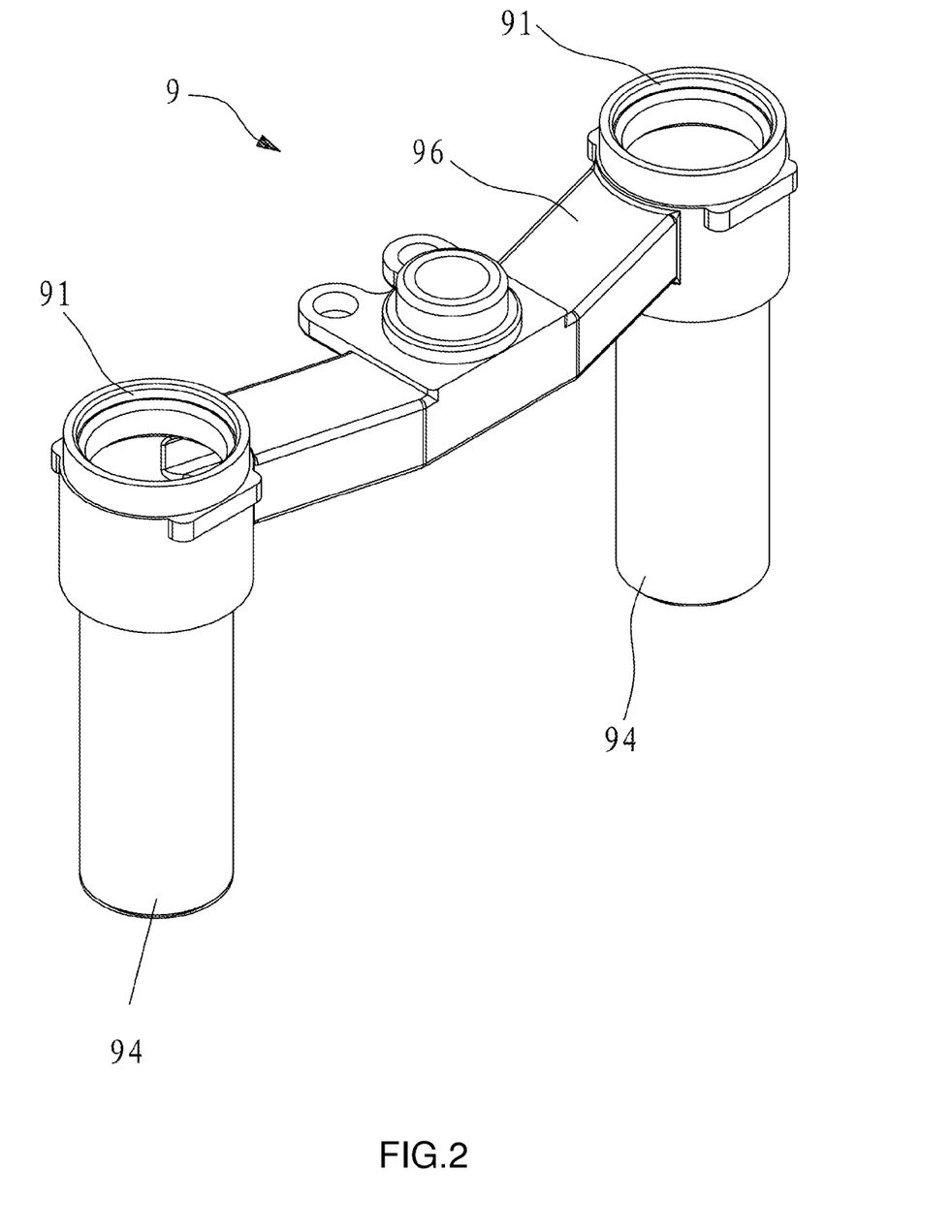
FIG. 2 is a structural view showing the valve seats, the connecting tube, and the inlet pins in the existing double-handle faucet.

As shown in FIGS. 1 and 2, a conventional double-handle faucet 9 mainly comprises two valve seats 91, two spools 92, two handles 93, two inlet pins 94, an outlet pipe 95, a connecting tube 96, an upper panel 97, and a lower panel 98. The two valve seats 91 and the connecting tube 96 are casted into one piece. The two inlet pins 94 form a water connection with the outlet pipe 95 via the connecting tube 96. The spools 92 are installed in the valve seats 91 to control the conduction state between the inlet pins 94 and the connecting tube 96. An end of the control lever 921 of the spool 92 passes through the upper panel 97 and then is connected with the handle 93. A lower end of the inlet pin 94 passes through the lower panel 98 and then is jacketed with a gasket 99 so as to connect with a cool water pipe or a hot water pipe. Thereby, during use, one can obtain water with a suitable temperature from the outlet pipe 95 by rotating the two handles 93. In the conventional double-handle faucet 9 described above, the valve seats 91 and the connecting tube 96 are generally made of a copper alloy, which not only has a high cost, but also pose certain hazard on the user due to lead in the copper alloy.

To solve the above problems, many manufacturers have developed to mold the double-handle faucet 9 in such a manner that the valve seats 91 and the connecting tube 96 are formed by engineering plastics, and the valve seats 91 and the inlet pins 94 are then connected by secondary encapsulation. In this way, the pollution of water due to lead in the copper alloy is overcome. However, in the practical processing, engineering plastics of high quality are applied to ensure the whole strength of the double-handle faucet 9. As a result, this suffers from a relatively high cost, which has a significantly adverse effect on the mass marketing of the product.

In view of this, the present inventor has made an intensive study on the above drawbacks of the existing double-handle faucet 9, and thus come up with the present invention.

BRIEF SUMMARY OF THE INVENTION

It is an object of the present invention to provide a double-handle faucet. With the double-handle faucet of the invention, it is possible to not only avoid lead hazard, but also greatly reduce the cost by a structural design, which eliminates the use of high quality engineering plastics, and facilitates mass marketing of the product.

To achieve the above object, the present invention proposes the following technical solution:

a double-handle faucet, comprising two valve seats, two spools, two inlet pins, two handles, an outlet pipe, a connecting tube, an upper panel, and a lower panel, the two valve seats are connected by the connecting tube; wherein the double-handle faucet further comprises two semi-cladding members, the two valve seats, the connecting tube, and the two semi-cladding members are all made of a plastic material, each of the valve seats is provided with an upper annular flange and a lower annular flange which are arranged in the vertical direction and spaced apart from each other, each of the inlet pins is further provided with a connecting ring, each of the semi-cladding members comprises two first enveloping parts and a second enveloping part which is between the two first enveloping parts and forms an integral part with the two first enveloping parts, the two first enveloping parts are located at both sides and correspond to the positions of the valve seats, the second enveloping parts of the two valve seats together cover the outer side of the connecting tube, each of the first enveloping parts comprises an enveloping shell, a supporting flange, a semicircular accommodating groove, and a locking seat, the supporting flange is arranged below the enveloping shell and protrudes inwardly, the lower annular flange and the connecting ring are together embedded into the semicircular accommodating groove of two first enveloping parts of the semi-cladding members, a top surface of the enveloping shell is abutted against the upper annular flange, each locking seat is provided with a connecting hole, two semi-cladding members are connected by passing screws through respective connecting hole in the locking seat at the same side to connect with a nut.

Furthermore, each of the two valve seats is provided with a protruding shell in a direction towards the connecting tube, each of the protruding shells is further provided with a first screw hole, one of the second enveloping part of the two semi-cladding members is provided with a second screw hole, the first screw hole and the second screw hole are connected by a screw.

With the above structure, in the double-handle faucet of the invention, the two valve seats, the connecting tube, and the two semi-cladding members are all made of a plastic material, so that lead hazard can be completely removed. Besides, based on the provision of two semi-cladding members and the structural design regarding the valve seats, the inlet pins, and the two semi-cladding members, the two semi-cladding members can oppositely cover the outer side of two valve seats, so as to fasten the inlet pins and the valve seats. In this way, the whole structural strength of the double handle can be greatly enhanced. Therefore, at the premises of meeting the relating industrial standards, it is possible to reduce strength of the plastics itself, thus further reduce the production cost significantly.

REFERENCE NUMERALS IN THE DRAWINGS 100 double-handle faucet
1 valve seat
11 upper annular flange
12 lower annular flange
13 protruding shell
131 first screw hole
14 screw
2 spool 3 inlet pin
31 connecting ring
4 handle
5 outlet pipe
51 gasket
6 connecting tube
71 upper panel
72 lower panel
8 semi-cladding member
81 first enveloping part
811 enveloping shell
8111 top surface
812 supporting flange
813 semicircular accommodating groove
814 locking seat
8141 connecting hole
82 second enveloping part
83 screw
84 nut
9 double-handle faucet
91 valve seat
92 spool
921 control lever
93 handle
94 inlet pin
95 outlet pipe
96 connecting tube
97 upper panel
98 lower panel
99 gasket

DETAILED DESCRIPTION OF THE INVENTION

The present invention will be described in detail hereinafter by referring to specific embodiments thereof, as so to further explain the technical solution of the present invention.

Figure 3:
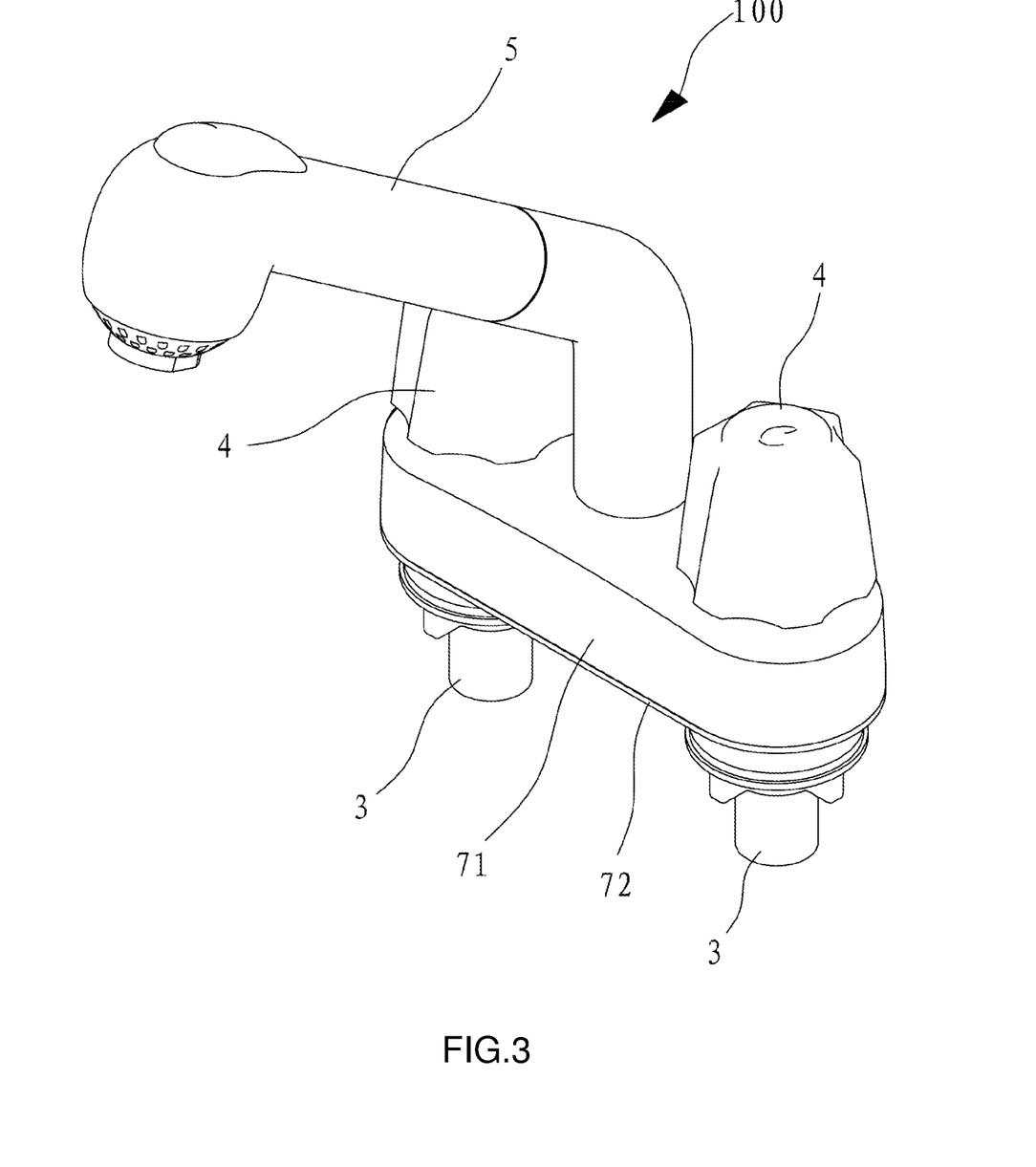
FIG. 3 is a structural view showing a double-handle faucet of the present invention.
Figure 4:
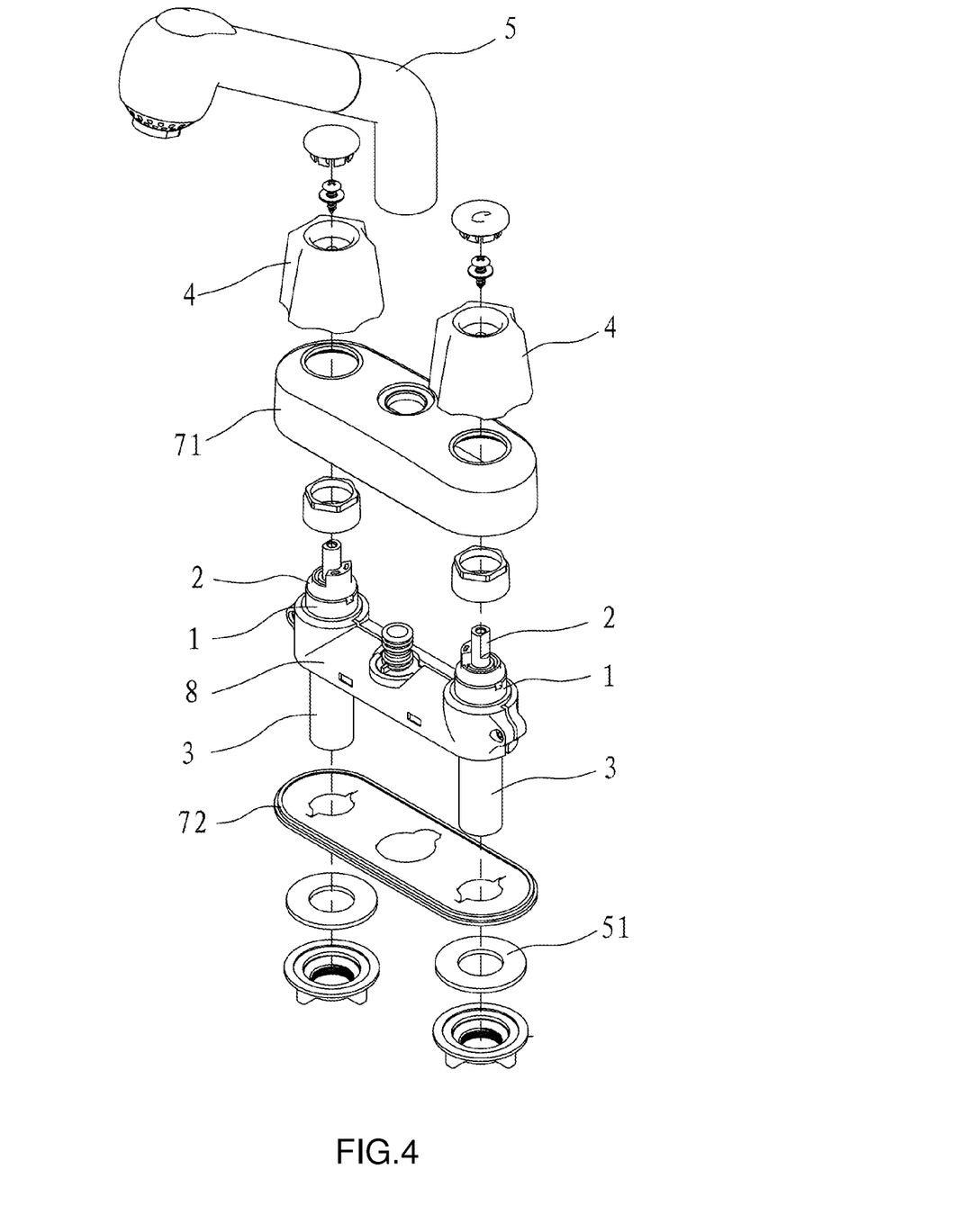
FIG. 4 is an exploded view showing a double-handle faucet the present invention.
Figure 5:
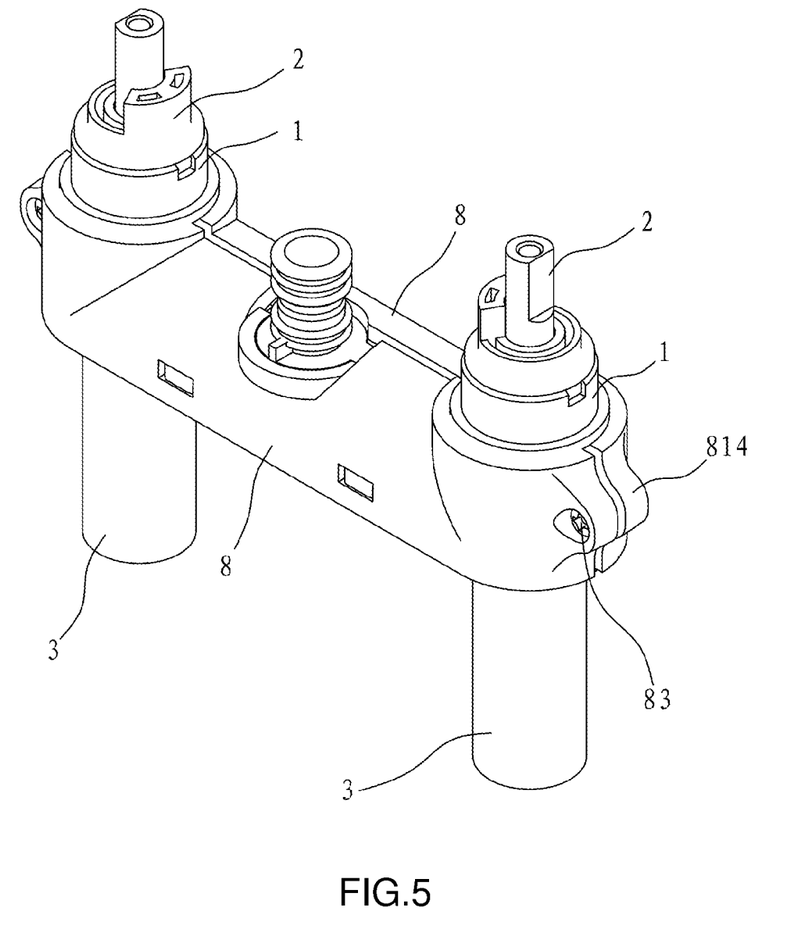
FIG. 5 is an assembling view showing the spools, the valve seats, the connecting tube, and the inlet pins in a preferred embodiment of the present invention.

Reference is made to FIGS. 3-7, which show structural views the double-handle faucet according to preferred embodiments of the present invention. As shown in FIGS. 3 and 4, like the prior art, the double-handle faucet 100 also comprises two valve seats 1, two spools 2, two inlet pins 3, two handles 4, an outlet pipe 5, a connecting tube 6, an upper panel 71, and a lower panel 72. The two valve seats 1 are connected by the connecting tube 6. A gasket 51 is further arranged between the inlet pins 3 and a cool water pipe or a hot water pipe. The above features and their connection relationship are basically identical to those in the prior art. They are not the emphasis of the present invention, and thus are not described in detail herein.

The core improvements of the present invention lie in that the double-handle faucet 100 further comprises two semi-cladding members 8, and the two valve seats 1, the connecting tube 6, and the two semi-cladding members 8 are all made of a plastic material.

As shown in FIGS. 4-7, each of the valve seats 1 is provided with an upper annular flange 11 and a lower annular flange 12. The upper annular flange 11 and the lower annular flange 12 are arranged in the vertical direction and spaced apart from each other. As shown in the drawing, the upper annular flange 11 is arranged over the lower annular flange 12.

Figure 6:
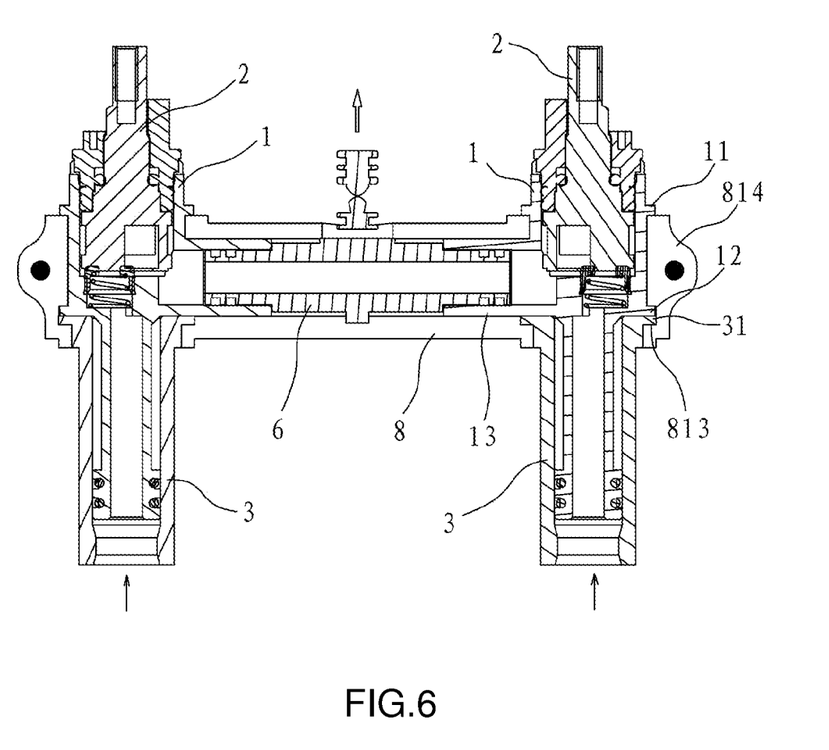
FIG. 6 is a cross sectional view of FIG. 5.
Figure 7:
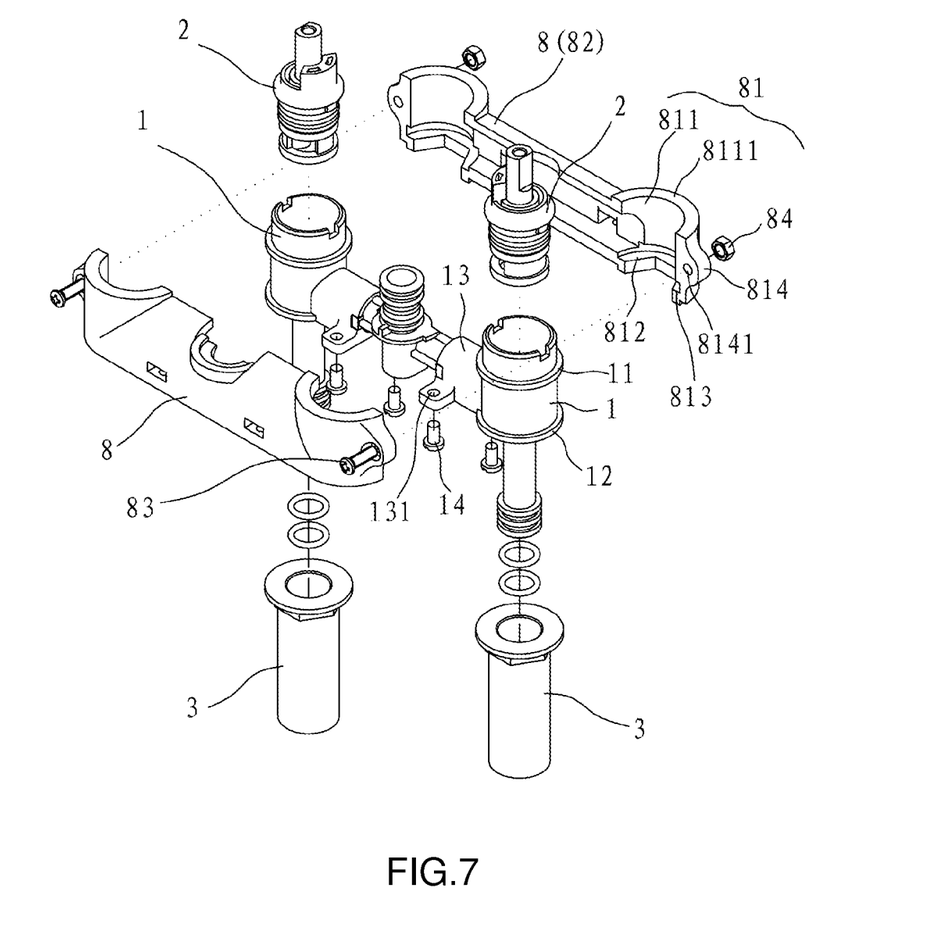
FIG. 7 is an exploded view showing the spools, the valve seats, the connecting tube, and the inlet pins in a preferred embodiment of the present invention.

As shown in FIGS. 6 and 7, each of the inlet pins 3 is further provided with a connecting ring 31. As shown in FIG. 7, each of the semi-cladding members 8 comprises two first enveloping parts 81 and a second enveloping part 82. The second enveloping part 82 is between the two first enveloping parts 81, and the second enveloping part 82 forms an integral part with the two first enveloping parts 81. The two first enveloping parts 81 are located at both sides of the semi-cladding member 8 and correspond to the positions of the valve seats 1. The second enveloping parts 82 of the two valve seats 1 together cover the outer side of the connecting tube 6.

As shown in FIG. 7, each of the first enveloping parts 81 comprises an enveloping shell 811, a supporting flange 812, a semicircular accommodating groove 813, and a locking seat 814. The supporting flange 812 is arranged below the enveloping shell 811 and protrudes inwardly. As further shown in FIG. 6, the lower annular flange 12 and the connecting ring 31 are together embedded into the semicircular accommodating groove 813 of two first enveloping parts 81 of the semi-cladding members 8. The top surface 8111 of the enveloping shell 811 is abutted against the upper annular flange 11.

As shown in FIGS. 4-7, each locking seat 814 is provided with a connecting hole 8141. Two semi-cladding members 8 are connected by passing screws 83 through respective connecting hole 8141 in the locking seat 814 at the same side to connect with a nut 84.

To further improve the whole structural strength of the double-handle faucet 100, each of the two valve seats 1 is provided with a protruding shell 13 in a direction towards the connecting tube 6. Each of the protruding shells 13 is further provided with a first screw hole 131. One of the second enveloping part 82 of the two semi-cladding members 8 is provided with a second screw hole (not shown). The first screw hole 131 and the second screw hole are connected by a screw 14.

In this manner, in the double-handle faucet 100 of the invention, the two valve seats 1, the connecting tube 6, and the two semi-cladding members 8 are all made of a plastic material, so that lead hazard can be completely removed. Besides, based on the provision of two semi-cladding members 8 and the structural design regarding the valve seats 1, the inlet pins 3, and the two semi-cladding members 8, the two semi-cladding members 8 can oppositely cover the outer side of two valve seats 1, so as to fasten the inlet pins 3 and the valve seats 1. In this way, the whole structural strength of the double handle 100 can be greatly enhanced. Therefore, at the premises of meeting the relating industrial standards, it is possible to reduce strength of the plastics itself, thus further reduce the production cost significantly.

Of course, in the practical implementation, the inlet pins 3 can be made of metal, and the strength at the inlet end can be improved significantly by torsion test. Besides, the outlet pipe 5 can be installed on the connecting tube 6 in a detachable manner. For example, the outlet pipe 5 can be directly inserted into the connecting tube 6, and the outlet pipe 5 and the connecting tube 6 are fastened together by a screw or the like. Alternatively, the outlet pipe 5 and the connecting tube 6 can be connected directly by means of screw threads, thus improving the versatility of the double-handle faucet 100. For example, the outlet pipe 5 of different specifications can be replaced for a 4-inch basin, a 4 or 8-inch kitchen faucet. Thus, the faucet is easy to replace and has a low cost.

The embodiments and drawings set forth above do not intend to limit the mode and design of the product according to the present invention. Any variation and modification thereto by the ordinary skilled in the art should fall within the scope of the present invention.

What is claimed is:

1. A double-handle faucet, comprising two valve seats, two spools, two inlet pins, two handles, an outlet pipe, a connecting tube, an upper panel, and a lower panel, wherein the two valve seats are connected by the connecting tube, characterized in that, the double-handle faucet further comprises two semi-cladding members, the two valve seats, the connecting tube, and the two semi-cladding members are all made of a plastic material, each of the valve seats is provided with an upper annular flange and a lower annular flange which are arranged in the vertical direction and spaced apart from each other, each of the inlet pins is further provided with a connecting ring, each of the semi-cladding members comprises two first enveloping parts and a second enveloping part which is between the two first enveloping parts and forms an integral part with the two first enveloping parts, the two first enveloping parts are located at a left side and a right side respectively of each of the semi-cladding members and correspond to the positions of the valve seats, the second enveloping parts of the two semi-cladding members together cover the outer side of the connecting tube, each of the first enveloping parts comprises an enveloping shell, a supporting, flange, a semicircular accommodating groove, and a locking seat, the supporting flange is arranged below the enveloping shell and protrudes inwardly, the lower annular flange and the connecting ring are together embedded into, the semicircular accommodating groove of two first enveloping parts of the semi-cladding members, a top surface of the enveloping shell is abutted against the upper annular flange, each locking seat is provided with a connecting hole, two semi-cladding members are connected by passing screws through respective connecting hole in the locking seat at the same side to connect with a nut.

2. The double-handle faucet of claim 1, characterized in that, each of the two valve seats is provided with a protruding shell in a direction towards the connecting tube, each of the protruding shells is further provided with a first screw hole, one of the second enveloping part of the two semi-cladding members is provided with a second screw hole, the first screw hole and the second screw hole are connected by a screw.

* * * * *